United States Patent
Love et al.

[11] Patent Number: 6,091,508
[45] Date of Patent: *Jul. 18, 2000

[54] MULTI-FUNCTION PERIPHERAL SYSTEM WITH DOWNLOADABLE DRIVERS

[75] Inventors: Shaun Timothy Love; Martin Geoffrey Rivers; Hugh Deral Spears, all of Lexington, Ky.

[73] Assignee: Lexmark International, Inc., Lexington, Ky.

[*] Notice: This patent issued on a continued prosecution application filed under 37 CFR 1.53(d), and is subject to the twenty year patent term provisions of 35 U.S.C. 154(a)(2).

[21] Appl. No.: 08/934,275

[22] Filed: Sep. 19, 1997

Related U.S. Application Data

[63] Continuation-in-part of application No. 08/713,300, Sep. 13, 1996, Pat. No. 5,754,740.

[51] Int. Cl.[7] ............................... G06K 1/14; G06F 3/00; B41B 27/02
[52] U.S. Cl. ..................... 358/1.15; 358/1.13; 358/1.16; 358/1.1; 710/8; 710/10
[58] Field of Search .................................... 395/109, 610, 395/114, 111; 358/1.15, 1.13, 1.1, 1.14, 1.16; 707/514, 515, 516, 509; 710/8, 10; 712/100

[56] References Cited

U.S. PATENT DOCUMENTS

| | | | |
|---|---|---|---|
| 5,091,747 | 2/1992 | Tsai | 355/202 |
| 5,140,674 | 8/1992 | Anderson et al. | 395/111 |
| 5,146,544 | 9/1992 | Altham et al. | 395/115 |
| 5,179,690 | 1/1993 | Ishikawa | 395/500 |
| 5,222,200 | 6/1993 | Callister et al. | 395/112 |
| 5,228,118 | 7/1993 | Sasaki | 395/112 |
| 5,235,674 | 8/1993 | Cohen-Skalli et al. | 395/101 |
| 5,239,621 | 8/1993 | Brown, III et al. | 395/115 |
| 5,353,388 | 10/1994 | Motoyama | 395/117 |
| 5,361,134 | 11/1994 | Hu et al. | 358/296 |
| 5,446,837 | 8/1995 | Motoyama et al. | 395/145 |
| 5,454,066 | 9/1995 | Tsai | 395/106 |
| 5,454,067 | 9/1995 | Tsai | 395/106 |
| 5,483,624 | 1/1996 | Christopher et al. | 395/117 |
| 5,499,108 | 3/1996 | Cotte et al. | 358/400 |
| 5,502,797 | 3/1996 | Bush et al. | 395/115 |
| 5,526,469 | 6/1996 | Brindle et al. | 395/109 |
| 5,544,045 | 8/1996 | Garland et al. | 364/419.03 |
| 5,555,435 | 9/1996 | Campbell et al. | 395/800 |
| 5,594,838 | 1/1997 | Christopher et al. | 395/117 |
| 5,745,748 | 4/1998 | Ahmad et al. | 395/610 |
| 5,905,852 | 5/1999 | Love et al. | 395/114 |
| 5,937,150 | 8/1999 | Phan | 358/1.15 |

*Primary Examiner*—Edward L. Coles
*Assistant Examiner*—Coulter Henry
*Attorney, Agent, or Firm*—Needle & Rosenberg, P.C.; D. Brent Lambert

[57] ABSTRACT

The present invention allows the operation of an attached external input device by a printer. The external input device may be, for example, a scanner or digital camera giving the printer the capability to function as a copier. Software to control or "drive" the input device is optionally contained within the printer ROM or can be downloaded dynamically from the host computer or from another source. Because the software to drive the input device can be downloaded to the printer dynamically, a wide variety of devices can be used.

19 Claims, 4 Drawing Sheets

MULTI-FUNCTION PERIPHERAL SYSTEM WITH DOWNLOADABLE DRIVERS

This is a continuation-in-part of U.S. patent application Ser. No. 08/713,300 filed Sep. 13, 1996, U.S. Pat. No. 5,754,748 entitled, "Download of Interpreter to a Printer."

TECHNICAL FIELD

This invention relates to the general area of electronic printing devices. More specifically, it relates to the area of devices known as multi-function peripherals (MFP)

BACKGROUND OF THE INVENTION

Multifunction peripherals (MFP) are devices capable of performing several related tasks in the area of scanning, printing, duplicating and/or faxing documents, etc. One method to implement an MFP is by integrating a document scanner and a computer printer into a single device. Printing and scanning can each be carried out by utilizing just one component of the device, copying may be performed by utilizing both device components.

The main shortcoming of such an integrated MFP device is the lack of flexibility. For example, individuals already owning a printer or scanner cannot readily upgrade it to an integrated MFP. Further, the quality of the components used in the integrated MFP device may not match an individual's needs. For example, potential users may be satisfied with the scanner but be unwilling to settle for ink jet rather than laser printing.

An alternative to a single integrated MFP is to attach multiple peripheral devices to a host computer system. Such a technique allows for the greatest flexibility in the ability to select components that meet the user's needs. However, this approach suffers from being host based. Operation of host based devices increases the workload of the host computer, thereby degrading the performance of other applications that may be executing on the host computer. Further, such a configuration necessitates the use of a host computer—the scanner and printer cannot readily be used as a copier without the host computer.

SUMMARY OF THE INVENTION

In the present invention, shortcomings of both of the above alternatives are overcome. The present invention allows the operation of an attached external input device by a printer. The external input device may be, for example, a scanner or digital camera giving the printer the capability to function as a copier. Software to control or "drive" the input device is optionally contained within the printer ROM or can be downloaded dynamically from the host computer or from another source. Because the software to drive the input device can be downloaded to the printer dynamically, a wide variety of devices can be used.

If a device not supported by the current printer control software is to be attached and controlled by the printer, additional software in the form of a driver for this new device is required. The driver for the new input device may be linked into the main body of the printer control software without need for replacement of the existing printer software.

Unlike an integrated MFP device, the present invention allows the user to select components that suit the user's needs. Unlike the host based alternative, the user is able to perform functions such as copying which requires the combined operation of multiple devices without needing access to the host computer. In the present invention, it is even possible for the various devices to function without being attached to a host at all. This would find great use where a shared network printer is located in a common work area, but there is no locally attached host computer.

DETAILED DESCRIPTION OF THE INVENTION

Figure 1:
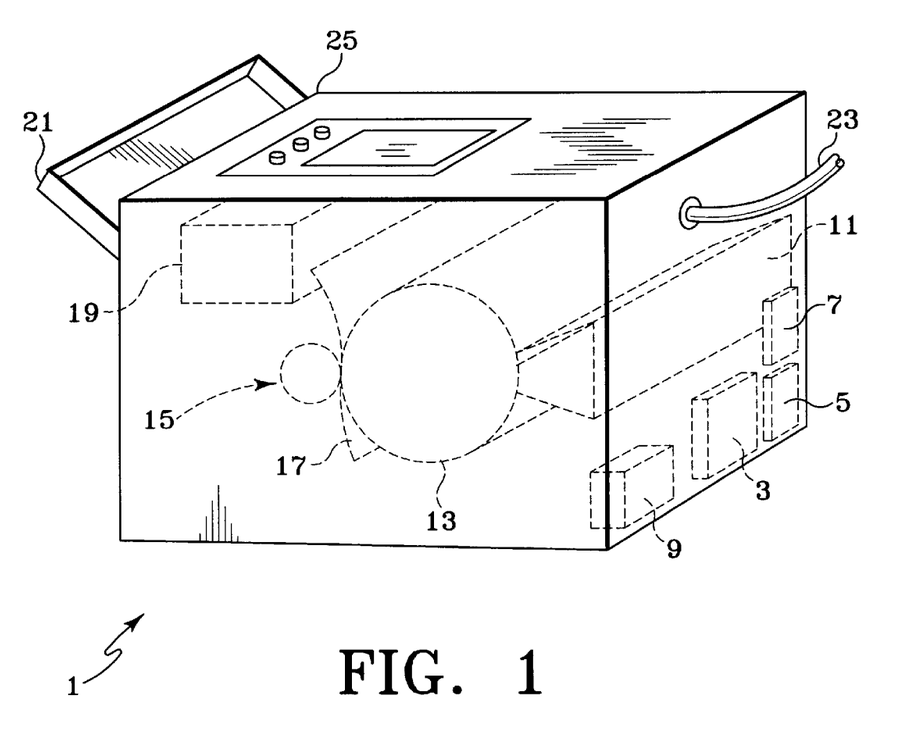
FIG. 1 shows a printer such as might make use of the invention.

FIG. 1 illustrates an example of a laser printer such as that which may be used in the present invention. Note that a laser printer is shown for illustrative purposes only—ink jet printers or other printer types using different marking technologies may also be used to implement the present invention.

Printer 1, shown in FIG. 1, may be a standard laser printer widely sold by LEXMARK™, the assignee of this invention, which has the internal code to interpret, for example, POSTSCRIPT® and HEWLETT PACKARD PCL® page description languages, as well as PJL, a control code set, the reset code SIC (for set initial conditions), and to print from downloaded bit maps created by WINDOWS® software. Printer 1 is controlled by microprocessor 3, which has standard Read Only Memory or ROM 5 (or other equivalent storage device) and read/write memory, RAM, 7. Downloaded code may be stored for use by Microprocessor 3 in nonvolatile random access memory 9, which may be flash memory or disc storage, as is now known. The illustrated printer 1 has an optical system 11 operative on a photoconductive drum 13. Drum 13 is toned and transfers the toned image defined by optical system 11 at transfer station 15 to paper 17. The image is fixed, typically by heat, at fixing station 19, and the finished printed page is delivered to output tray 21. Printer 1 receives code to be interpreted and downloaded code on cable 23 and has an operator control panel 25.

Figure 3:
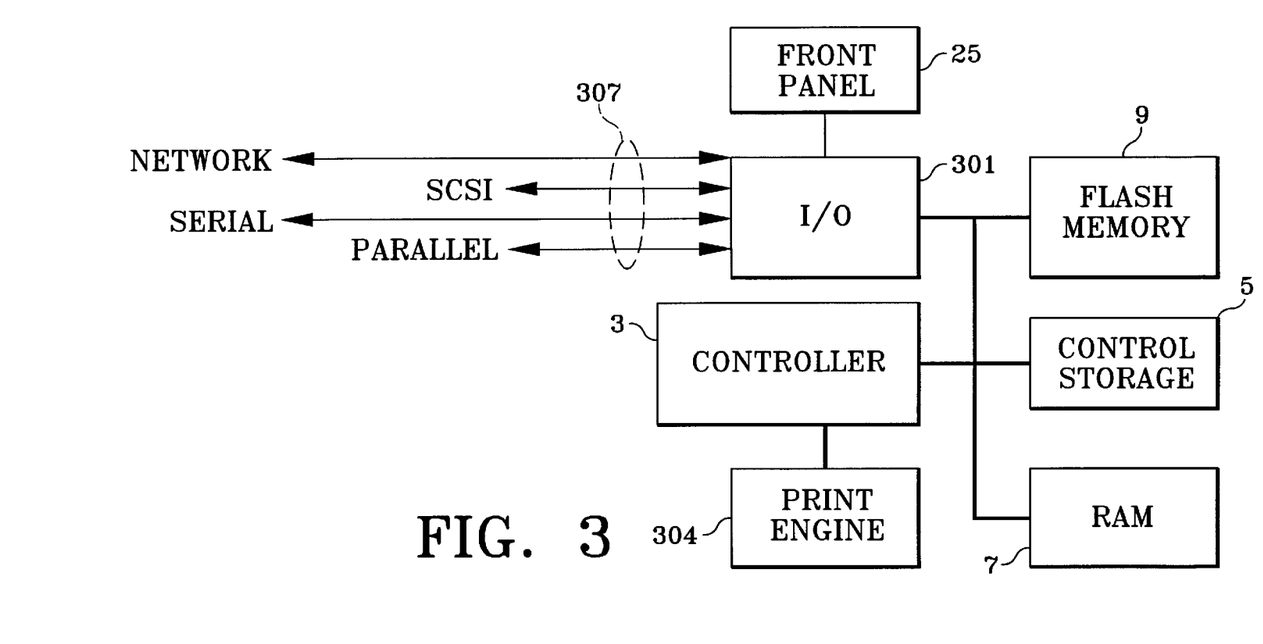
FIG. 3 shows a block diagram of the functional components within the printer.

As shown in further detail in FIG. 3, the printer 1 contains an input/output subsystem 301, a controller 3, read only memory (ROM) 5 (or equivalent) to store the control program, a print engine 304 (reference numerals 11, 13, 15 and 19 in FIG. 1), random access memory (RAM) 7, and an optional secondary storage 9 such as flash memory.

The I/O subsystem 301 is coupled to various communications channel ports 307 as well as to a front panel 25 for direct communications with an operator. The I/O subsystem 301 contains the hardware and circuitry necessary for physically implementing the transfer of data to and from a selected communications channel port 307. The functions of the I/O subsystem 301 are available through the use of various subroutines in the control program, which are executed by the controller 3 as needed.

For example, if data needs to be transferred out the serial port, the controller 3 has available a routine in ROM 5 (or other equivalent storage device) which directs the I/O subsystem 301 to transfer a specified amount of data from a specified location in either ROM 5 or RAM 7 out through the serial port. An example of how that routine might be used in a computer program is shown below.

SendData(SERIAL, buffer, buffersize);
wherein "SendData" is the name of the routine, and "SERIAL", "buffer" and "buffersize" are parameters representing the serial port, the buffer and the size of the buffer, respectively. All other data communications ports 307 can be accessed and utilized in a similar manner.

The control program stored within ROM 5 (or other device) also may contain routines for receiving data from the communications channel ports 307. Collectively, this set of routines is know as the Basic Input Output System (BIOS) and is well understood by those skilled in the art.

Figure 4:
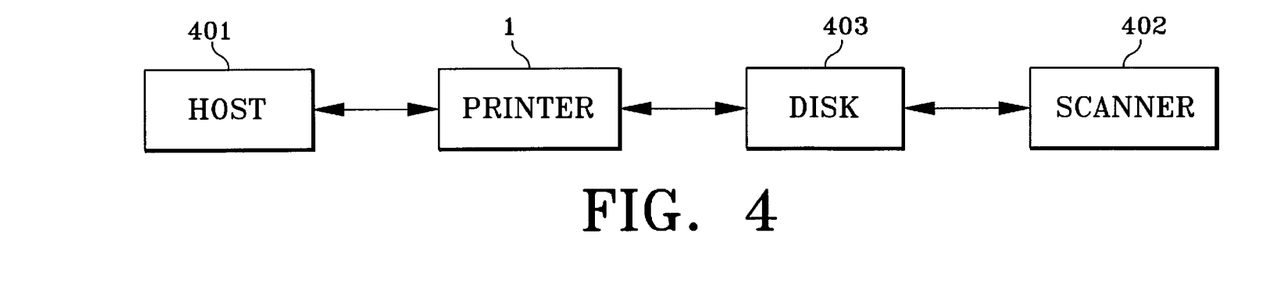
FIG. 4 shows one possible configuration for this invention.

FIG. 4 depicts a common configuration of data processing equipment that may be used in the present invention. In one embodiment, all the devices shown may be interconnected on a SCSI chain—of course, other suitable configurations may be used, as well.

A common use of the data processing equipment of FIG. 4 would begin with a request for image data being sent from the host computer 401 to the scanner 402. The scanner 402 responds by transferring image data back to the host computer 401 where the data is stored in an application program (not specifically shown). Suitable image processing operations (e.g., optical character recognition, etc.) may be performed on the image data by the application program.

Once image processing is complete, print data, including processed image data from the scanner 402, is sent from the host computer 401 to the printer 1. The printer controller (shown as 3 in FIG. 3), upon receiving and processing part of the print data from the host 401, may determine that certain resources, such as font data, must be accessed from the disk 403. The printer 1 addresses data retrieval commands to the disk 403 which cause the disk 403 to transmit the required font data back to the printer 1. The printer 1 utilizes the font data from the disk 403 and the print data from the host 401 to prepare an image that it prints on an output page.

In such a configuration, the printer 1 initiates commands that control the operation and transfer of data from the disk 403, but the printer 1 does not control the scanner 402. Control of the scanner 402 resides solely in the host computer 401. This is true despite the fact that the printer 1 is the final destination for the image data produced by the scanner 402.

In one embodiment of the present invention, the configuration of FIG. 4 may be used. The novelty and benefits of the present invention lie in the ability to incorporate additions into the control program of the printer 1. These additions are in the form of a new emulator, such as a copy emulator functioning as a driver for scanner 402, to allow the combination of scanner 402 and printer 1 to be used as a photocopier. Such a copy emulator provides the printer 1 with the ability to control the scanner 402 directly without relying upon the host computer to do so.

The copy emulator software controls the scanner 402 by issuing commands just as might originate from control software running on a host computer 401. The copy software must be written with an understanding of the technical specifications of the particular scanner 402 to be controlled. Command data appropriate for one scanning device 402 may not be expected to be appropriate for any different device. Similarly, a copy emulator written for one specific scanner 402 would not be expected to properly control a different device. Information describing the communications protocols and command set is typically found in the technical literature describing the scanner 402.

Software control of a scanner 402 is well understood by those skilled in the art. The details regarding how such a driver can be incorporated into the control software of the printer 1 is described below.

The architecture of the printer 1 may be designed to support multiple emulators that reside in ROM 5. This requires the presence of an emulation manager whose job it is to keep track of the state of each emulation and assign incoming jobs to the proper emulator. In addition, in an embodiment of the present invention, new emulators can be downloaded and will coexist with those already in ROM (shown as 5 in FIG. 3). Such a technique requires the solution of two problems.

The first problem is that the code for the new emulator must be linked to routines, such as those in the BIOS, that already exist in ROM (shown as 5 in FIG. 3). The second problem is that the emulation manager must be able to determine the presence of the new emulator and invoke it at the appropriate time. Appropriate solutions to these problems are described in further detail below.

Downloading of Software to Printer

Printer 1 is configured with both a table of routines and their corresponding address in ROM (shown as 5 in FIG. 3). Additionally, code to link downloaded codes is stored in ROM 5. It should be understood that the term "routine" in the context of this invention includes the storing of variables which may be used by more than one functional routine. Variables define factors subject to change, such as paper tray selection, interrupt input from an operator control panel and any other such factor. The term "Symbol" is sometimes used to encompass both functional routines and variables. That terminology is unnecessary here since the term "routine" is understood to encompass associated variables.

The code to be downloaded to add an interpreter or driver (emulator) to printer 1 is first prepared. This downloadable code is created first by using a standard compiler and linker. The compiler performs the usual task of compiling all source code modules into object code files; then the linker combines the object files into a Common Object File Format (often abbreviated COFF) (or equivalent) file. While the output files of most linkers are ready (or almost ready) to be executed, the COFF file for a downloaded interpreter or driver (emulator) in accordance with this invention is not nearly ready for execution. Many of the functions and data variables addressed by the interpreter or driver (emulator) are resident in the printer 1 and are not available to the linker at this time. These are termed "external" routines. The external routines are not available at this time, but they are included in a section of the COFF file termed "Relocation Tables", which contain directions for further operations of the related data, termed Raw Data. Additionally, the functions and data belonging to the interpreter or driver (emulator) itself (termed the "internal" routines) cannot be completely acted on because their final disposition depends on precisely where they are stored by microprocessor 3 when the interpreter or driver (emulator) is integrated with the printer 1. Thus, the COFF file is only partially linked, and considerably more data processing is required prior to executing the interpreter or driver (emulator).

A custom tool, the COFF file Preprocessor, is next employed to process the partially linked COFF file. The Preprocessor will complete any work that does not depend on the printer system, and will rearrange the contents so that the processing and resources required of the printer 1 are minimized. The Preprocessor creates a separate file, simply known as the "preprocessed" file, as its output, since the rearranged file is no longer in Common Object File Format. The following listing shows the major components of a COFF file and their order in the COFF file: COFF File Headers, Section 1 Raw Data, Section 2 Raw Data . . . Section n Raw Data, Section 1 Relocation Tables, Section 2 Relocation Tables . . . Section n Relocation Tables, Routine Table.

The COFF File Headers basically identify how much data is in all the components and where it is all located. The Raw Data sections are sets of program code, various types of data, or, in some cases, merely information. The Relocation Tables tell which of the Raw Data elements need to be resolved and which routine in the Routine Table is to be used to resolve it. The Routine Table contains all routine names (program functions and variable names) that are referenced in the Raw Data sections and a statement of where the routine is located (including a note to indicate if it is an "external" symbol).

The Preprocessor initially discards any information sections, since they are for documentation only and do not contain any code or data necessary for execution. This is accomplished by not writing the information section of Raw Data to the output preprocessed file and destroying the note of its existence in the Headers.

The Preprocessor now extracts only the "external" routines from the Routine Table and writes this reduced table of external routines to the beginning of the output file. The external routines are those stored in memory printer 1 and will be needed to do the final linking in the printer 1 at the time of download. The internal routines will be processed during this preprocessing phase. The reduced, external routine table is much smaller than the COFF Routine Table (typically less than 10%) and its placement at the beginning of the file will facilitate the processing required by the printer 1 at the time of download.

The Preprocessor now begins its relocation processing. A section of Raw Data is retrieved, along with the Relocation Tables of the same section, and processed in conjunction with the Routine Table of the COFF file (the unreduced one). Each Relocation Table element identifies a code or data element in the Raw Data Section, the number of the associated function or data variable name in the Routine Table, and the type of relocation to be accomplished. If a Relocation Table element refers to an external routine name, it cannot be resolved at this time, and is passed on to the output file to be processed by the printer 1. If the Relocation Table element refers to an internal routine, the Preprocessor will resolve the routine in relation to the associated Raw Data section. The resulting resolution is merged into the Raw Data element, and a note is added to the Relocation Table element to indicate that the base address of where the section is finally located by the printer 1 must be merged with the Raw Data element to complete the final relocation. Note the internal routine name is no longer needed, so it is discarded.

When an entire section has been relocated, its Raw Data is written to the output file, followed by its Relocation Tables. When all sections are processed, the Raw Data and Relocation Tables are interspersed in the output file. This is in contrast to the original COFF File, which had all Raw Data sections together, followed by all Relocation Tables. Since the printer 1 needs three things to begin processing (Raw Data, Relocation Table, and Routine Table), this rearrangement will allow the printer 1 to begin its processing slightly earlier. The normal COFF File format would require the entire file to be downloaded and set aside in temporary resource before beginning processing. The rearranged preprocess output file is in the order shown in the following: Preprocessed File Headers, External Routine Table, Section 1 Raw Data, Section 1 Relocation Tables, Section 2 Raw Data, Section 2 Relocation Tables . Section n Raw Data, Section n Relocation Tables.

That completes the preparation of code to be downloaded to the printer 1. Printer 1 has stored in ROM 5 a Routine Table which contains every routine that such download code might call. Such routines including variables can number about 8,000 in some applications and about 15,000 or more in other applications, depending on the number and complexity of the interpreter or interpreters to be downloaded to the printer 1. These are the external routines. All of these external routines are necessarily existing routines, since it is a purpose of this invention to make maximum use of routines already in the printer 1. Representative functional routines (as distinguished from variables) found in the Routine Table are as follows:

Mathematical Functions

1. Divide signed number by another signed number.
2. Multiply numbers.
3. Divide unsigned numbers by unsigned numbers.
4. Compute square root of numbers, lowest precision.
5. Compute square root of numbers, double precision.
6. Compute exponent of a number, lowest precision.

Character Manipulation Services

1. Strlen—Determine the length of a character string.
2. Strcmp—Compare one character string to another.
3. Strncmp—Compare a portion of one character string to another.
4. Strncpy—Copy a portion of one character string to another.
5. Strncat—Append a portion of one character string to another.
6. Strcat—Append one character string to another.
7. Memset—Set a block of memory to a given value.
8. Memcpy—Copy a block of memory.

Conversions

1. Cnvfp2si—Convert a floating-point real number to a signed integer.
2. Cnvfp2dp—Convert a floating-point real number to a double precision integer.
3. Cnvdp2ui—Convert a double precision integer to an unsigned integer.
4. Cnvdp2fp—Convent a double precision integer to a floating point real number.
5. Cnvui2dp—Convert an unsigned integer to a double precision integer.
6. Cnvui2fp—Convert an unsigned integer to a floating point real number.
7. Cnvsi2fp—Convert a signed integer to a floating point real number.
8. Cnvdp2si—Convert a double precision integer to a signed integer.

9. Cnvsi2dp—Convert a signed integer to a double precision integer.

10. Cnvfp2ui—Convert a floating-point real number to an unsigned integer.

Printing Functions

1. Return the X, Y coordinates of an element.
2. Create a line segment between (0,0) and a point P.
3. Make a font available throughout the system.
4. Create a circular arc specified by three points.
5. Invert the intensities in an image.
6. Print the page.

Although the routines are stored in the standard printer, generally in the same block of memory, a table identifying the routines is not, as there is typically no need for a standard printer to have such a table after the code is compiled.

ROM 5 of printer 1 also contains code to execute the final linking of the downloaded code, which requires applying the routines of the Routine Table as directed by the Relocation Tables, as well as determination of available data storage space and storing of linked code to such space. Such functions are standard techniques and so will not be elaborated upon. Accordingly, the downloaded code either carries a header which activates the linking process of microprocessor 3 or this is activated from a control panel of printer 1.

In the embodiment just described, the resulting code in printer 1 is a new interpreter, which employs as much as possible existing code in printer 1. It is accordingly, not excessively demanding of memory space. The Routine Table in printer 1 is not normally in printers and could require large amounts of memory. Therefore, the Routine Table is compressed, the preferred compression being as follows.

Compression of Routine Table

A utility program for compression creates the compressed Routine Table by extracting each system routine that may be needed by the downloaded code. Location of all such routines is found by examination of the original operating system code of printer 1. The name and address are encoded into a relatively small identification number, and the Routine Table is a file containing all of the encoded values. The compression method used reduces the amount of required storage for the names from about 14 bytes (a byte is eight bits) per average symbol name to about 2.5 bytes, and from 4 bytes per address to about 3 bytes. For a representative system, which contains 10,000 routines, the overall reduction is from 180,000 bytes to 55,000 bytes.

Each routine name in the Routine Table is represented by a sequence of bytes encoded in ASCII, which is one byte (i.e., eight bits) for each character. The compression program rearranges the names into sets according to the length of the ASCII encoding. Each set of symbols is then processed separately. In the processing of each set of routines, each routine is encoded with three values—the first is a 14-bit value, the second is an 8-bit value and the third is an 8-bit value. The 14-bit value is the simple arithmetic sum of the "assigned value" of each character in the routine name. The second encoded value is a logical sum (exclusive OR) of each character in the name combined with the cumulative arithmetic sum of the characters up to that point (i.e., the 1st exclusive ORed with zero, then added to the 1st, the 2nd then exclusive ORed with the result and the sum of the 1st and 2nd added to that, and so on). The third encoded value is an alternating arithmetic sum of the characters in the odd numbered positions (1st, 3rd, 5th, etc.) with a logical sum of the characters in the even numbered positions (i.e., the 1st added to zero, then the 2nd exclusive ORed with the result, then the 3rd added to that, and so on).

The encoded methods are the result of trial and observation. The object is to arrive at an encoded result that is unique from all other results in the set of all routine names of a given length. The amount of storage required for an encoded result depends on how quickly a unique encoded value can be reached (if the 14 bit value is unique for a given name, no further encoding is necessary). The "assigned value" of each character used in the arithmetic and logical sum is an arbitrary value used for each character in lieu of its ASCII character code. The assigned values are spread out, rather than being sequential, to reduce the chance that different combinations of characters produce the same sum.

After performing the encoding for all routines of a given length are generated, the list of encodings is analyzed. For each encoding where the first 14-bit value is unique, the bits 00 are prepended to this quantity to make it a 16-bit quantity and to indicate that the encoding is 16 bits. The two eight bit encodings are discarded. For each encoding where the 22 bit value (first encoding and second encoding) is unique, the bits 01 are added to the front of this quantity to make it a 24 bit quantity and to indicate that the encoding is 24 bits. For each encoding where the 30 bit value (first encoding and second encoding and third encoding) is unique, the bits 1 followed by 0 are prepended to this quantity to make it a 32 bit quantity and indicate that the encoding is 32 bits. For those encodings which are not unique even out of 30 bits, the bits 1 and 1 are prepended to the 14 bit arithmetic sum, the two eight bit encoding are discarded, and the ASCII characters comprising the full routine name are substituted in their place. The full routine name is always unique, otherwise original code in printer 1 would not have compiled and linked properly.

Results of these encoding methods are about two thirds of the system routines require only the first encoded value (14 bit arithmetic sum), well over 99 percent are unique using the first and second encoding method, and virtually all are unique using all three encoded values. Typically, only one or two at most need to have the full routine name specified.

The encoding of the addresses of routines is entirely different. The addresses can be any number between 0 and 4 billion (a 32 bit hexadecimal unsigned number) and do not lend themselves well to encoding methods. Some space is saved with the following method: A set of 64 "base values" is provided as a starting point for reducing the addresses down to small numbers. For a given address, the largest base value is found that is not greater than the address. The difference between the address and the base value is stored, with leading zeros removed. The difference is usually a relatively small number with some leading zero bytes.

The compressed data stored consists of a control byte followed by the appropriate significant bytes. The control byte, in turn, contains two encoded fields. Two bits define the number of significant bytes that follow the control byte (00 for 1, 01 for 2, 10 for 3 and 11 for 4). The other 6 bits define which of the 64 base values was used in the encoding. The subsequent decoding of the routine value reverses the process. The first two bits of the control byte are used to extract the appropriate number of significant bytes, leading zero bytes are prepended, and the resulting number is added with the base value amount specified by the lower six bits of the control byte. The 64 base values are zero and the next 55 increments of 10000 in hexadecimal (hex) (which is 65,536 in decimal) (i.e., zero, 10000 [hex], 20000 [hex], and so on). Those each vary from the next by 65,536 in decimal, with the highest being 3,604,408 in decimal. Those are the closest to the addresses of the functional routines. The variables are located by much higher address numbers, and, to accommodate those, seven increments beginning with 20000000 hex (which is 536,870,912 in decimal), which vary from the next by 10000 hex (65,536 in decimal) are employed, the highest of these seven being 537,264,128 decimal. Finally, one basis is 28000000 hex (671,088,640 decimal) to accommodate the very highest numbers.

This encoding method reduces the average space required per routine address from four bytes to three. In the vast majority of cases, the difference between the routine address and the closest base value contains two leading zero bytes and two significant bytes. Thus, three bytes are required to encode it, rather than the four bytes that would be required for the straightforward non-encoded value.

Linking by the Printer

Figure 2:
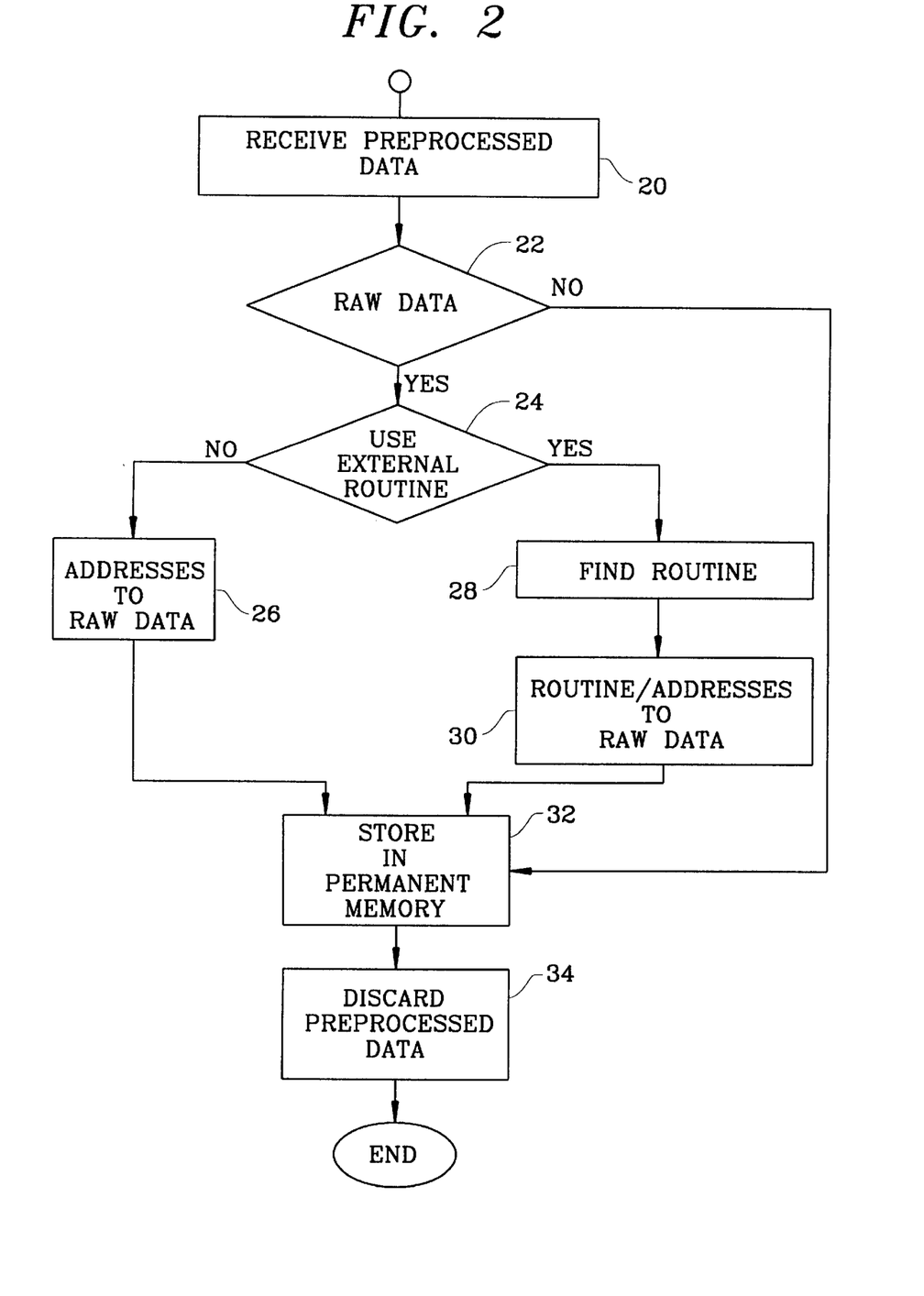
FIG. 2 is a flow diagram depicting a process performed by the present invention.

The linking steps of this preferred embodiment are illustrated in FIG. 2. Initially, of course, printer 1 receives the preprocessed file data, function 20, starting with the External Routine Table and then beginning with Raw Data and its Relocation Tables, followed immediately by other Raw Data and its associated Relocation Tables. Linking in printer 1 may begin with the reception of the External Routine Table and the Raw Data and Relocation Tables.

The data is examined for Raw Data in function 22. If yes, in the next function, function 24, the Relocation Table is examined for use of an external routine. If no, the associated addresses are combined with the Raw Data and it is stored in printer 1 in function 26. If yes, the routine name is employed to determine its size (an initial element in decompressing) and the three coded values, by which the location of the routine in the embedded table in printer 1 is found in function 28. Then the routine is applied to the Raw Data in accordance with the instructions of its Relocation Tables and associated addresses are combined with the Raw Data and stored in printer 1 in function 30.

At each conclusion of function 30 and function 26, function 22 is again invoked to examine received code for further Raw Data. If that operation of 22 is yes, the data processing returns to function 24. If no, the data processing stores the entire code in permanent location (usually flash memory) in function 32, and proceeds to function 34 in which the downloaded preprocessed file is discarded and the data processing ended.

Downloading Multi-Function Peripheral (MFP) Software

During the process of linking the copy emulator (previously described), certain specific function names may be used. These include, for example, oemPORInit( ), oemStartEmul( ), oemBeginMenus( ), oemInteractMenus( ) and oemEndMenus( ). The addresses of these routines, if present, as well as the code size of the emulator and other control information are assembled into a data structure which is placed at the head of the emulator code. The emulator is downloaded from the host computer 401 to nonvolatile storage 9 such as flash memory by writing the header information and code to an address on the storage device 9 reserved for that purpose.

Following the download of the copy emulator, the printer 1 undergoes a power on reset (POR). As part of the POR process, the emulation manager determines if any dynamically linked code is present. Looking in the reserved location in flash memory 9 to determine if a data structure describing downloaded code is present does this. Finding the copy emulator there, information from the header is copied into a data structure maintained by the emulation manager. This makes the copy emulator available just as any of the original emulators stored in ROM 5.

Next, the emulation manager uses the function pointer found in the header to call oemPORInit( ) that is part of the copy emulator. This function allows the copy emulator to determine the proper mailbox where it will be receiving messages and also allows it to register a sniffing function.

When a new job arrives at the printer 1, it is necessary to determine which emulator should process it. This process is called sniffing. Sniffing is performed by inspecting data from the beginning of the new job and determining how well it matches the known characteristics of the data streams supported. When a new emulator is added, the original sniffing code makes a determination of what emulator it believes is appropriate. The sniffing function registered by the downloaded emulator is then given the opportunity to override this decision and claim the job as its own.

To provide interaction with a user, each emulator, including download emulators, can have functions for operating menus on the front panel 25. When the user scrolls through the options of the main menu, an option will become available for the downloaded emulator. Selecting that menu item causes the menu function in the downloaded emulator to be invoked. The menu function can efficiently control the menu for the emulator and interact with the user by operating as a finite state machine.

When the user presses a button on the front panel 25, this action is communicated to the menu function and results in a state change. New menu options are displayed on the front panel to indicate the new state. Other actions may accompany the change of state, such as updating of variables or the transmission of data through the BIOS.

Figure 5:
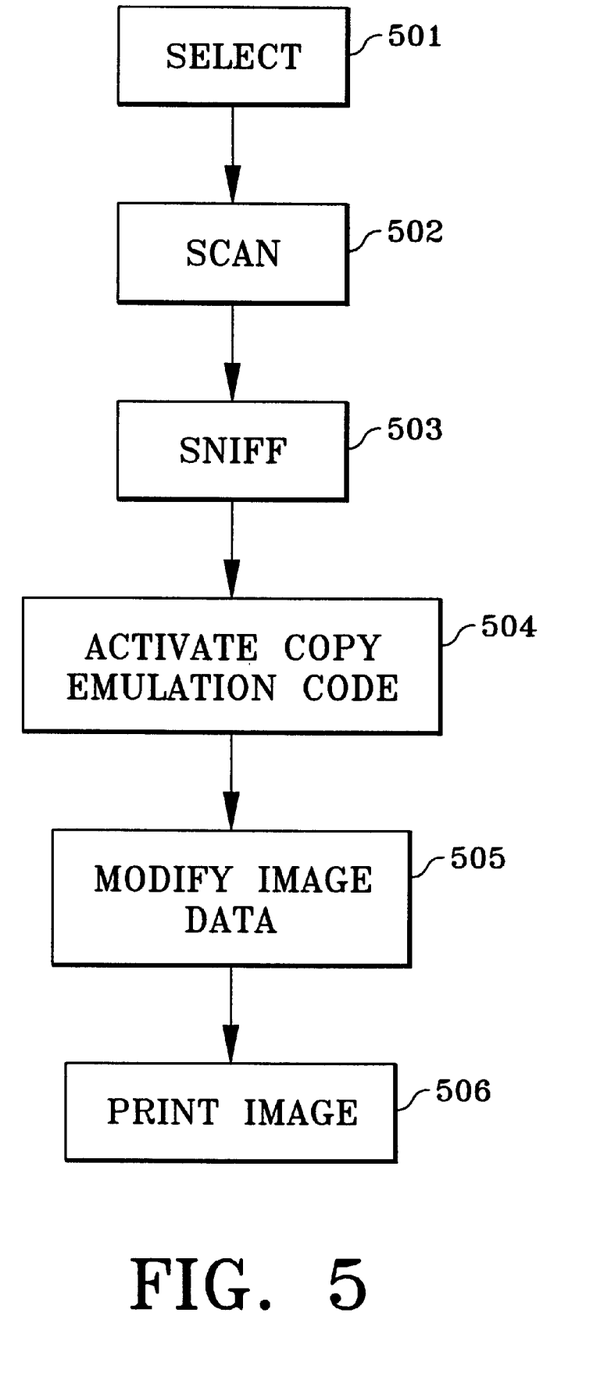
FIG. 5 is another flow diagram depicting a process performed by the present invention.

With the scanner 402 attached and the new driver installed, the process of operating the system as a copier is described below, with reference in [brackets] to the reference numerals of FIG. 5:

[501] The user scrolls through menu functions using the front panel 25 until "Copy Menu" (or equivalent) is displayed. Selecting this option invokes the Copy emulator menu function. This function causes the front panel to display options such as "Scale", "Darkness", "Copies" and "Start". Selecting anything but "Start" would allow the user to modify the values of parameters used when the copy is made.

[502] Selecting "Start" on the front panel 25 approves of the values selected in step 501, and causes the menu function to send a command through the BIOS to The menu function is then exited. Image data subsequently received back from the scanner 402 is perceived to be the start of a new job.

[503] Because the original sniffing code will likely not recognize the code being received from the scanner 402 (because the scanner 402 may not be the original scanner designed to be used with the overall system), the original sniffing code may make an incorrect determination of what emulator is appropriate. The sniffing function registered by the copy emulator is then called and overrides the potentially incorrect decision by claiming the job for the copy emulator.

[504] The emulation manager then activates the copy emulation code and assigns to it the incoming job.

[505] The copy emulator code receives the image data from the scanner 402 and performs scale and darkness modifications based on values previously approved by the user. The modified image data is stored in a bitmap representing the page to be printed.

[506] When the bitmap is complete it is transferred to the print engine 304 where the appropriate number of copies are printed. This completes the job and the printer 1 returns to the ready state.

In another embodiment of the present invention, the printer 1 may be connected to a fax modem via the serial port 307. When input data is detected on the serial port 307, the downloaded driver decodes the fax transmission producing image data, which is then printed by the printer 1.

In yet another embodiment of the present invention, the printer 1 may be connected to a network and the downloaded driver may be similar to a web browser. Such a driver would be able to address user-specified locations on the World Wide Web so as to download and print those documents (i.e. pull printing).

Conclusion

It will be noted that the creation of the preprocessed code is done without immediate time or memory size restraints, and is done once for repeated reuse. Therefore, optimizing that code for use by the printer data processing is desirable. Of course, preparation of the downloaded code requires a knowledge of which routines are in the printer, and this is known for existing printers. It may be desirable to add routines particularly for the purpose of being used in an additional interpreter in accordance with this invention. Although the table of routines may be part of the original printer code, it also may be downloaded into the printer any time prior to its use. Other variations will be apparent and can be anticipated. Accordingly, patent coverage commensurate with this invention is sought, with particular reference to the accompanying claims.

What is claimed is:

1. A multifunctional peripheral system adapted for use with a computer system including at least one computer, comprising:
   (a) a first peripheral device for performing a pre-selected function for the computer system, the first peripheral device coupled to the computer and including a storage device;
   (b) means for downloading from the computer system a device driver associated with a second peripheral device, and for storing the device driver in the storage device of the first peripheral device; and
   (c) means for executing the device driver, the device driver executing means resident on the first peripheral device.

2. The system of claim 1, wherein the first peripheral device comprises a scanner.

3. The system of claim 1, wherein the first peripheral device comprises a printer.

4. The system of claim 1, wherein the storage device comprises a flash ROM.

5. The multifunctional peripheral system of claim 1, wherein the device driver executing means operatively couples the first peripheral device to the second peripheral device.

6. The multifunctional peripheral system of claim 1, wherein the storage device is contained within a printer.

7. A multifunctional peripheral system adapted for use with a computer system including at least one computer, comprising:
   (a) plurality of peripheral devices and at least one of which is coupled to the computer, the at least one device including a storage device;
   (b) means for downloading from the computer system a device driver associated with at least one of the other of the plurality of peripheral devices, and for storing the device driver in the storage device of the at least one peripheral device; and
   (c) means for executing the device driver, the device driver executing means resident on the at least one peripheral device, so as to operatively couple the at least one peripheral device to each other.

8. The system of claim 7, wherein at least one of the plurality of peripheral devices comprises a scanner and wherein at least one of the plurality of peripheral devices comprises a printer.

9. The system of claim 7, wherein the storage device comprises a flash ROM.

10. The multifunctional peripheral system of claim 7, wherein the device driver executing means operatively couples the plurality of peripheral devices to the computer system.

11. A process for operatively coupling an additional peripheral device to a computer system including at least one computer and a first peripheral device, comprising the steps of:
    (a) downloading from the computer system to the first peripheral device a device driver associated with the additional peripheral device;
    (b) storing the device driver in a storage device on the first peripheral device, and;
    (c) executing the device driver on the first peripheral device so as to operatively couple the computer system to the additional peripheral device.

12. A process for operatively coupling a plurality of peripheral devices to each other by using a computer system including a computer and at least a first peripheral device, comprising the steps of:
    (a) downloading from the computer system a device driver to the first peripheral device associated with at least one other peripheral device;
    (b) storing the device driver in a storage device of the first peripheral device, and;
    (c) executing the device driver on the first peripheral device so as to operatively couple the first peripheral device to the other peripheral device.

13. The process of claim 12, wherein at least one of the plurality of peripheral devices comprises a printer and wherein at least one of the plurality of peripheral devices comprises a scanner. system.

14. The process of claim 12, wherein the step of executing the device driver on the first peripheral device operatively couples the plurality of peripheral devices to the computer system.

15. A multifunctional peripheral system adapted for use with a computer system, comprising:
    (a) a first peripheral device for performing a pre-selected function for the computer system, the first peripheral device including a storage device;
    (b) means for storing a device driver in the storage device, the device driver associated with a second peripheral device; and
    (c) means for executing the device driver on the first peripheral device.

16. The multifunctional peripheral system of claim 16, wherein the second peripheral device comprises a scanner.

17. The multifunctional peripheral system of claim 15, wherein the second peripheral device comprises a printer.

18. The multifunctional peripheral system of claim 15, wherein the storage device is contained within a printer.

19. The multifunctional peripheral system of claim 15, wherein the storage device comprises flash memory.

* * * * *

UNITED STATES PATENT AND TRADEMARK OFFICE
CERTIFICATE OF CORRECTION

PATENT NO : 6,091,508
DATED : July 18, 2000
INVENTOR(S) : Shaun T. Love, Martin G. Rivers, Hugh D. Spears It is certified that error appears in the above-identified patent and that said Letters Patent are hereby corrected as shown below:

Claim 13, Column 12, Line 51 . . . comprises a scanner.

Signed and Sealed this

Seventeenth Day of April, 2001

Attest:

NICHOLAS P. GODICI

*Attesting Officer*  *Acting Director of the United States Patent and Trademark Office*